United States Patent [19]

Al-Attar

[11] Patent Number: 5,333,110
[45] Date of Patent: Jul. 26, 1994

[54] ELECTRONIC MAGNETIC COMPASS SYSTEM AND METHOD FOR INTERPRETING DIRECTIONS OF A VEHICLE

[75] Inventor: Rafi A. Al-Attar, Troy, Mich.

[73] Assignee: Chrysler Corporation, Highland Park, Mich.

[21] Appl. No.: 815,274

[22] Filed: Dec. 27, 1991

[51] Int. Cl.⁵ ............................................. G01C 17/38
[52] U.S. Cl. .................................... 364/449; 364/457; 340/979
[58] Field of Search ............... 364/559, 457, 460, 449, 364/571.07; 33/355 R, 361; 73/1 E; 340/870.33, 935, 979

[56] References Cited

U.S. PATENT DOCUMENTS

| | | | |
|---|---|---|---|
| 3,899,834 | 8/1975 | Harrison, Jr. | 33/352 |
| 3,991,361 | 11/1976 | Mattern et al. | 324/244 |
| 4,424,631 | 1/1984 | Franks | 33/361 |
| 4,425,717 | 1/1984 | Marcus | 33/361 |
| 4,505,054 | 3/1985 | Clark et al. | 33/357 |
| 4,546,551 | 10/1985 | Franks | 33/356 |
| 4,622,646 | 11/1986 | Waller et al. | 364/571.02 |
| 4,622,843 | 11/1986 | Hormel | 73/1 E |
| 4,677,381 | 6/1987 | Geerlings | 324/253 |
| 4,694,583 | 9/1987 | Blaney | 33/361 |
| 4,698,912 | 10/1987 | Fowler et al. | 33/356 |
| 4,796,188 | 1/1989 | Gale et al. | 364/443 |
| 4,866,627 | 9/1989 | Suyama | 364/457 |
| 4,873,655 | 10/1989 | Kondraske | 364/571.07 |
| 5,021,962 | 6/1991 | Helldörfer et al. | 364/457 |

FOREIGN PATENT DOCUMENTS 60-135814 7/1985 Japan.
2056686 3/1981 United Kingdom.

Primary Examiner—Thomas G. Black
Assistant Examiner—Michael Zanelli
Attorney, Agent, or Firm—Mark P. Calcaterra

[57] ABSTRACT

A method and apparatus for interpreting magnetic directions for an electronic compass system mounted on a moving vehicle such as an automobile. The directions of North, Northeast, East, Southeast, South, Southwest, West and Northwest are each assigned predetermined degree ranges which are included in a look-up table used by a controller. The predetermined degree ranges associated with the directions of North, South, East and West are further each set at equal values, while the predetermined degree ranges of Northeast, Northwest, Southeast and Southwest are set equally at a value that is less than the values of the North, South, East and West directions. A flux-gate senses the Earth's magnetic field and generates an analog signal in accordance therewith. The analog signal is converted into a corresponding digital signal by an analog-to-digital converter. The controller receives the corresponding digital signal and converts the digital signal into a degree heading. The controller then compares the degree heading with the eight predetermined degree ranges included in the look-up table and generates a directional heading signal in accordance with the predetermined degree range within which the degree heading falls. A directional heading signal is then output to a visual display and displayed as one of the eight directional headings associated with the eight predetermined degree ranges. The invention thus simplifies the interpretation of heading information generated by an electronic compass system and reduces the chance of driver confusion by interpreting heading information more in accordance with the major geographic directions of North, South, East and West.

13 Claims, 5 Drawing Sheets $\vec{V_N} = \vec{V} + \vec{V_c}$

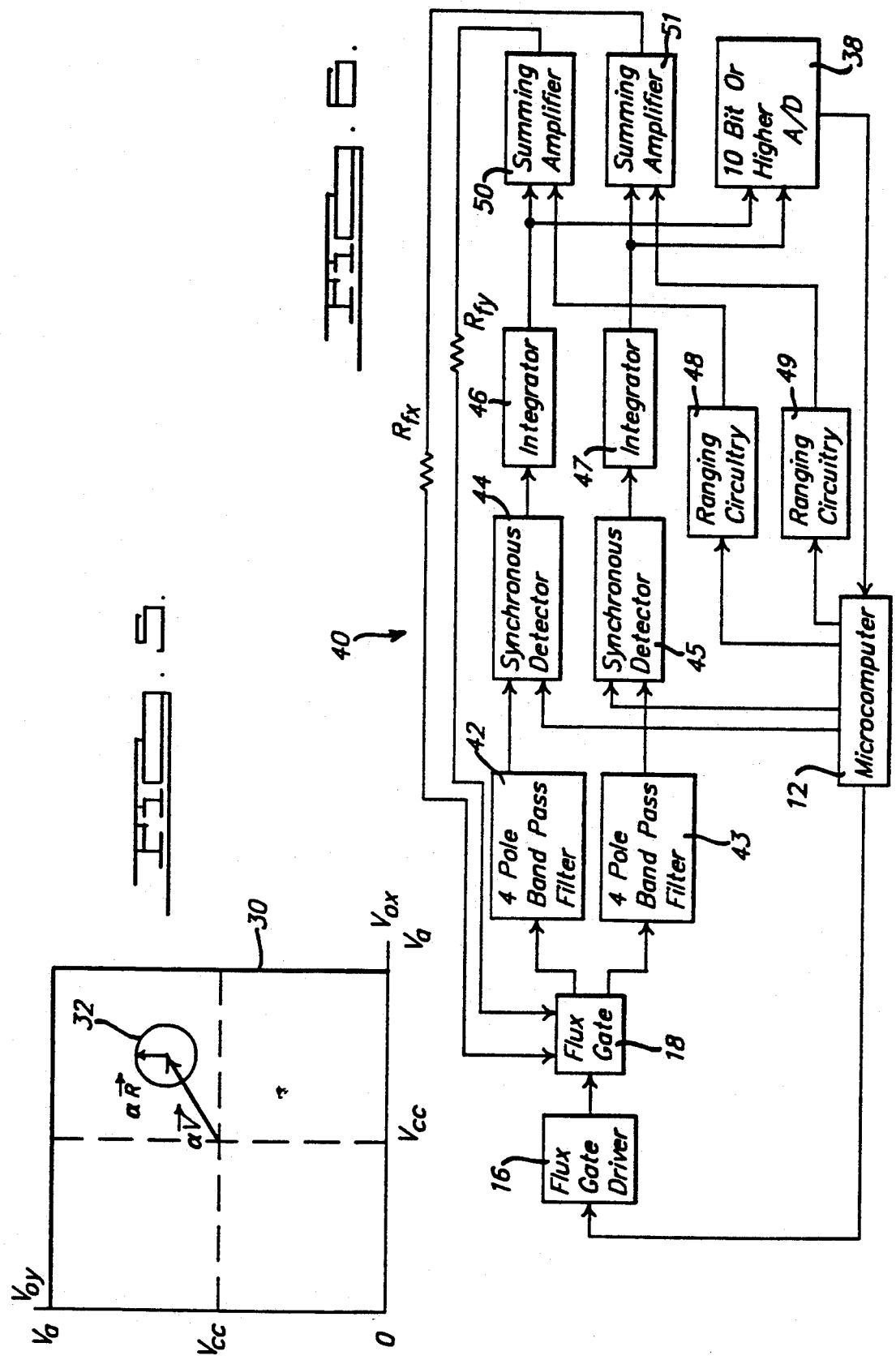

ELECTRONIC MAGNETIC COMPASS SYSTEM AND METHOD FOR INTERPRETING DIRECTIONS OF A VEHICLE

CROSS-REFERENCE TO RELATED APPLICATIONS

The present application is related to the following, co-pending applications filed concurrently herewith:

"Scaling System And Method For An Electronic Compass", application Ser. No. 07/815,347;

"Shifting System And Method For An Electronic Compass System", application Ser. No. 07/815,267;

"Data Processing Method For An Electronic Compass System", application Ser. No. 07/815,266;

"Heading Computation For An Electronic Compass", application Ser. No. 07/815,346;

"Magnetic Transient Detection And Calibration Technique For An Auto-Calibrating Compass", application Ser. No. 07/815,268;

"Method For Selecting Calibration Data For An Auto-Calibrating Compass", application Ser. No. 07/815,264;

"Flux-Gate Sensor Orientation Method", application Ser. No. 07/815,264;

"Noise Removal Method For An Electronic Compass", application Ser. No. 07/815,269;

"Flux-Gate Sensor Mounting And Method", application Ser. No. 07/815,270.

The disclosures of all the applications cited above are hereby incorporated by reference and made a part hereof the same as if fully set forth herein.

BACKGROUND OF THE INVENTION

1. Technical Field

The present invention relates to electronic compass systems and methods of operation therefor, and more particularly to a system and method for interpreting degree headings sensed by an electronic compass system in accordance with a plurality of predetermined degree ranges and displaying directional headings in accordance with the predetermined degree ranges.

2. Discussion

The present invention is related to and is an improvement of U.S. Pat. No. 4,622,843 to Hormel issued Nov. 18, 1986 entitled "Simplified Calibration Technique and Auto Ranging Circuit for an Electronic Compass Control Circuit". The present invention is also related to U.S. Pat. No. 4,807,462 issued Feb. 28, 1989, to Rafi A. Al-Attar and entitled "Method for Performing Automatic Calibrations in an Electronic Compass." These patents are hereby incorporated by reference. The present invention is related to and combinable with the commonly assigned patent application "Shifting System and Method for an Electronic Compass," application Ser. No. 07/815,267. This application is hereby incorporated by reference.

Normally, electronic compass systems employ a magnetic flux-gate sensor. The operation of the flux-gate sensor is well documented. See, Hisatsugu Itoh, "Magnetic Field Sensor and Its Application to Automobiles", SAE Paper No. 800123, pages 83–90, February, 1980; and Doug Garner, "A Magnetic Heading Reference for the Electro/Fluidic Autopilot," Sport Aviation, Part I, pages 19–26, November, 1981 and Part II, pages 20–32, 51, December, 1981. These documents are hereby incorporated by reference.

When an electronic compass system incorporating a flux-gate sensor is mounted to a vehicle, such as an automobile, it senses the earth's magnetic field as the vehicle travels, and also as the vehicle changes direction, and generates an output signal indicative of the heading of the vehicle. Typically, the heading is classified into one of eight headings corresponding to the geographic directions of North, Northeast, East, Southeast, South, Southwest, West and Northwest. Each geographic direction further typically comprises an equal range of 45 degrees. For example, the geographic North direction might typically be centered at 0° on a compass rose, and would typically cover a range of about 337.5° to 22.5°, or about ±22.5° from the 0° (due North) heading of the compass rose. Thus, the eight geographic directions typically are divided into perfectly equal ranges.

The above-mentioned division of the eight geographic directions into equal degree ranges is acceptable for some applications, such as marine navigation, where the vehicle, in such case a boat, is typically not confined to predetermined paths of travel such as roads. However, with motor vehicles such as automobiles, paths of travel are confined to roads, which in turn are most often laid out in accordance with the four major directional headings of North, South, East and West, or variations of these four directions. Roads that are marked and referred to as North-South or East-West running roads often include portions which vary from the markings of the road. For example, a North-South running road marked as "North" may meander at various points to become a slightly Northeast or Northwest heading road.

In situations such as described above, drivers of such vehicles can become confused when traveling on a "Northbound" road when an electronic compass system mounted on the driver's vehicle is indicating that the vehicle is traveling in a Northeast or Northwest direction. Since many, if not most North-South and East-West roads meander slightly from their overall directions at certain points, the chance for driver confusion can be significant. This problem can be particularly troubling when navigating freeways running through congested urban areas where such freeways, while traveling North-South or East-West overall, often meander considerably from their marked directions at various points.

Accordingly, it is a principal object of the present invention to provide an electronic compass system and method for interpreting degree heading signals from the system in a manner to help eliminate the confusion that exists when temporary variations are encountered in traveling primarily North-South and East-West roads, which are marked only as "North", "South", "East" or "West".

It is still a further object of the present invention to provide an electronic compass system and method of operation therefor which includes a controller and a look-up table, the look-up table having a plurality of predetermined degree ranges corresponding to the geographic directions of North, Northeast, East, Southeast, South, Southwest, West and Northwest, and wherein each of the predetermined degree ranges is uniquely associated with one of the just-mentioned geographic directions and wherein degree ranges of the major geographic directions of North, South, East and West are increased at the expense of the minor geographic directions of Northwest, Northeast, Southeast and Southwest.

SUMMARY OF THE INVENTION

The above and other objects are accomplished by an electronic compass system implementing a preferred method in accordance with the present invention. The electronic compass system for implementing the method of the present invention is typically mounted on a vehicle, such as an automobile, and typically includes the following elements: a sensor for sensing the earth's magnetic field and generating a degree heading signal representative of a geographic direction in which the vehicle is heading; a controller; and a look-up table. The look-up table incorporates a plurality of predetermined degree ranges, with each range being uniquely associated with one of the eight geographic directions of North, Northeast, East, Southeast, South, Southwest, West and Northwest. The predetermined degree range (in degrees) of each of the major geographic directions of North, South, East and West are further increased at the expense of the minor geographic directions of Northwest, Northeast, Southwest and Southeast.

The controller is responsive to the sensor and compares the directional heading signal with the predetermined degree ranges of the look-up table. The controller then generates a heading signal in accordance with the geographic direction of the predetermined degree range within which the directional heading signal falls. The signal may then be displayed on an external display system to provide a driver of the vehicle a visual indication of the heading of the vehicle at any given time.

In an alternative preferred method of the present invention the predetermined degree ranges are varied slightly to provide varying degree ranges for each of the geographic directions of North, Northeast, East, Southeast, South, Southwest, West and Northwest.

BRIEF DESCRIPTION OF THE DRAWINGS

Other objects and advantages will become apparent upon reading the following detailed description and upon reference to the drawings, in which:

FIG. 4 is a block diagram of a preferred embodiment of a compass system employing a scaling compensation system, and particularly well adapted to implement the method of the present invention;

FIG. 5 is a depiction of the same window as FIG. 3, but showing the vehicle's magnetic field voltage vector $\bar{V}$ and the earth's magnetic field voltage vector $\bar{R}$ after compensation in accordance with the method of the prevent invention;

FIG. 6 is a block diagram of an alternative preferred embodiment of an electronic compass system well suited for implementing the preferred methods of the present invention;

DETAILED DESCRIPTION OF THE PREFERRED EMBODIMENTS

Figure 1:
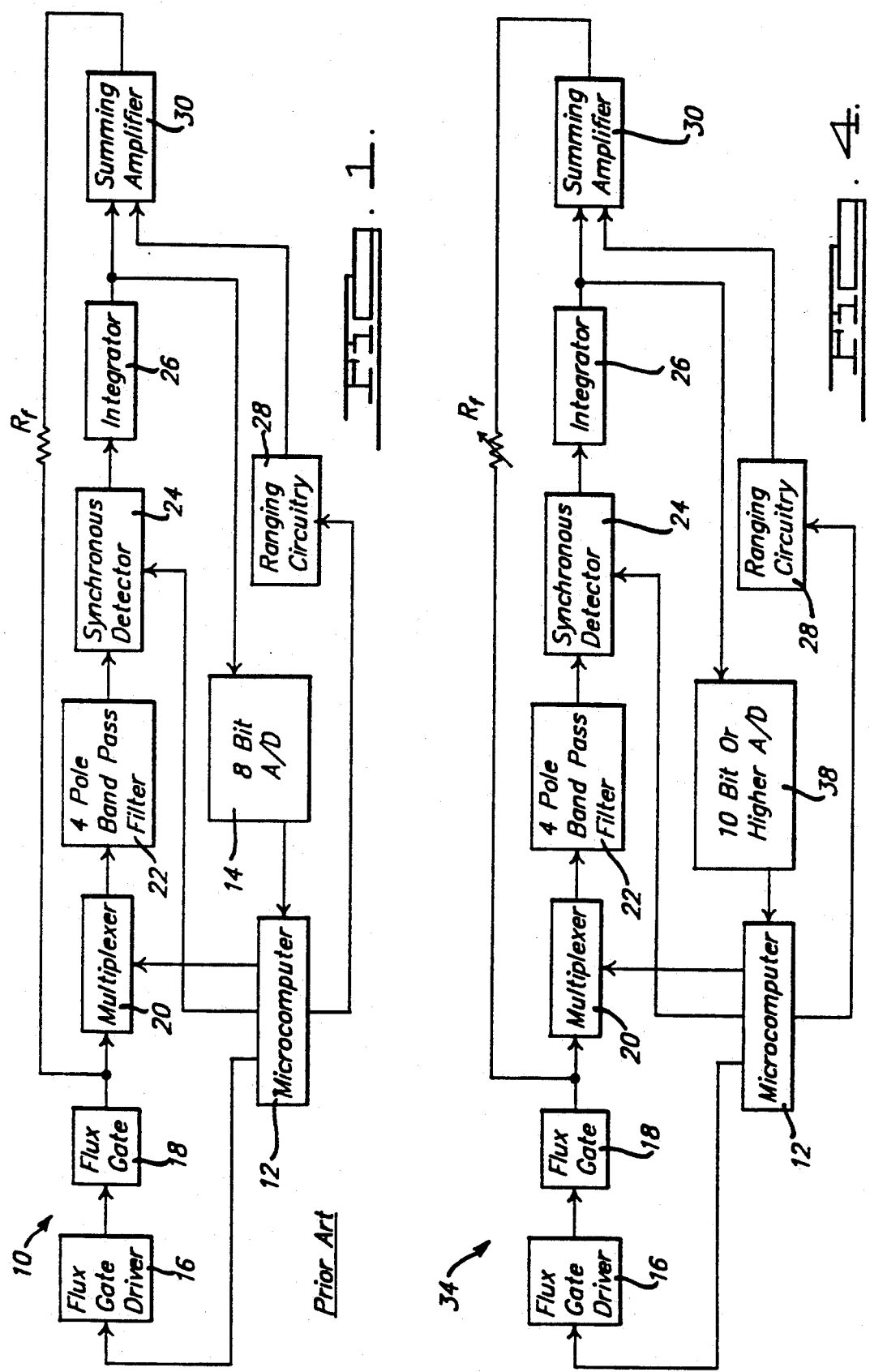
FIG. 1 is a block diagram of the electronic compass disclosed in the '843 patent to Hormel.

Turning now to FIG. 1, there is shown a block diagram of the electronic compass system 10 of the '843 patent to Hormel. Initially, it should be understood that the electronic compass system of FIG. 1 and the electronic compass systems of FIGS. 4 and 6 are being provided merely as background information to illustrate electronic compass systems which may be used to implement the preferred methods of the present invention, and that the preferred methods of the present invention will be described in detail following the discussion of FIGS. 1-6. It should be appreciated that virtually any compass system capable of generating heading information in the form of degrees could be used to implement the method of the present invention. Accordingly, a flux-gate sensor may not be required if an alternative, comparable, magnetic sensing device is incorporated. For example, "Hall-effect" sensors could be used if so desired.

The heart of the system of FIG. 1 is a microcomputer 12 which employs an 8-bit analog-to-digital converter 14. The microcomputer 12 controls operation of the electronic compass system 10, beginning with a flux-gate driver 16. Upon receipt of a square-wave signal from the microcomputer 12, the flux-gate driver 16 adds enough drive to the signal to saturate a flux-gate 18. The operation of the flux-gate driver 16 and flux-gate 18 are explained in the documents incorporated by reference, namely "A Magnetic Heading Reference for the Electro/Fluidic Autopilot" and "Magnetic Field Sensor and its Application to Automobiles, (SAE Paper No. 800123)". The flux-gate 18 employs two sense coils oriented perpendicularly to one another. Voltages are induced across the sensor coils by the presence of the magnetic fields of the vehicle and the earth.

The voltages from the sense coils of the flux-gate 18 are selected by a multiplexer 20. The multiplexer 20 is in communication with the microcomputer 12, which generates a signal for controlling a network for switching use of a four-pole bandpass filter 22, a synchronous detector 24 and an integrator 26 periodically from one sense coil to the other. The multiplexer 20 is in communication with the four-pole bandpass filter 22, which filters out all but the second harmonic signals, whose amplitude is proportional to the earth's magnetic field. Second harmonic signals are presented to the synchronous detector 24. The function of the synchronous detector 24 is to select the portion of the filtered signals to be integrated by the integrator 26. The output of the synchronous detector 24 is a half-wave rectified signal which is fed into the integrator 26.

The output of the integrator 26 periodically switches back and forth between two DC levels corresponding to the two sense coils of the flux-gate 18. Integrator output is stabilized by feeding back a current through resistor $R_f$ to the sense coils of the flux-gate 18. The feedback current eventually generates an equal and opposite magnetic field versus that produced by the magnetic field sensed by the flux-gate 18. Therefore, the output voltages, $V_{ox}$ and $V_{oy}$, of the integrator 26 are directly proportional to the sensed magnetic field by a constant $R_f$ which is the feedback resistance:

$$V_{ox}=KR_f(\vec{V}_{mx}+\vec{R}_{mx}).$$

where $\vec{V}_{mx}+\vec{R}_{mx}$ is the geometric addition (or resultant) of the magnetic fields of the earth and the vehicle in the x coil. Similarly, $$V_{oy}=KR_f(\vec{V}_{my}+\vec{R}_{my})$$

where $\vec{V}_{my}+\vec{R}_{my}$ is the geometric resultant at the magnetic field, of the earth and vehicle in the y coil.

The ranging circuit 28 used in the '843 patent to Hormel moves the DC levels at the integrator output closer to the origin and toward a magnitude within the window. The ranging circuit 28 generates a compensation field such that $$\vec{V}_n+\vec{R}=\vec{V}+\vec{R}+\vec{V}_c \text{ or } \vec{V}_n=\vec{V}+\vec{V}_c$$

where $\vec{V}_n$ is the new vehicle magnetic field voltage vector, $\vec{R}$ is earth's magnetic field voltage, and $\vec{V}_c$ is the compensation field voltage vector.

Heading information is determined from the output of the integrator 26. The microcomputer 12 is coupled to the integrator output through the 8-bit analog-to-digital converter 14. The 8-bit analog-to-digital converter 14 converts the DC levels to digital codes (i.e., coordinates) referenced to a cartesian coordinate system. The microcomputer 12 divides the y-coordinate, corresponding to the DC level from one coil, by the x-coordinate, corresponding to the other coil, and takes the arctangent of the quotient using a piece-wise-linear-function-of-x routine to yield the vehicle's heading. Calibration is then performed under the method of the '462 patent.

The integrator 26 employs operational amplifiers which have linear voltage output ranges of approximately 0 to $V_a$ volts. In the '843 patent to Hormel, the linear voltage output range is approximately 0 to 10 volts. Since the voltages induced across the sense coils of the flux-gate 18 may be negative or very large, these voltages must be modified for use in the integrator 26. Negative voltages are modified by tying the sense coils of the flux-gate 18 to a reference voltage of $V_{cc}$, halfway between 0 and $V_a$ volts. In the '843 patent to Hormel, $V_{cc}$ is equal to 5 volts.

The magnitude of the voltage outputs of the integrator 26 are indirectly reduced to some extent by the operation of a ranging circuit 28. However, the primary purpose of the ranging circuit 28 is to bring the DC output levels of the integrator 26 into a range that the software in the microcomputer 12 can handle, not to compensate for abnormally large vehicle magnetic fields. It accomplishes this through the use of negative feedback through resistor $R_f$. The ranging circuit 28 monitors integrator output and employs a variable voltage source, having an operational amplifier, to produce feedback. The outputs of the integrator 26 and ranging circuit 28 are combined in a summing amplifier 30.

Figure 2:
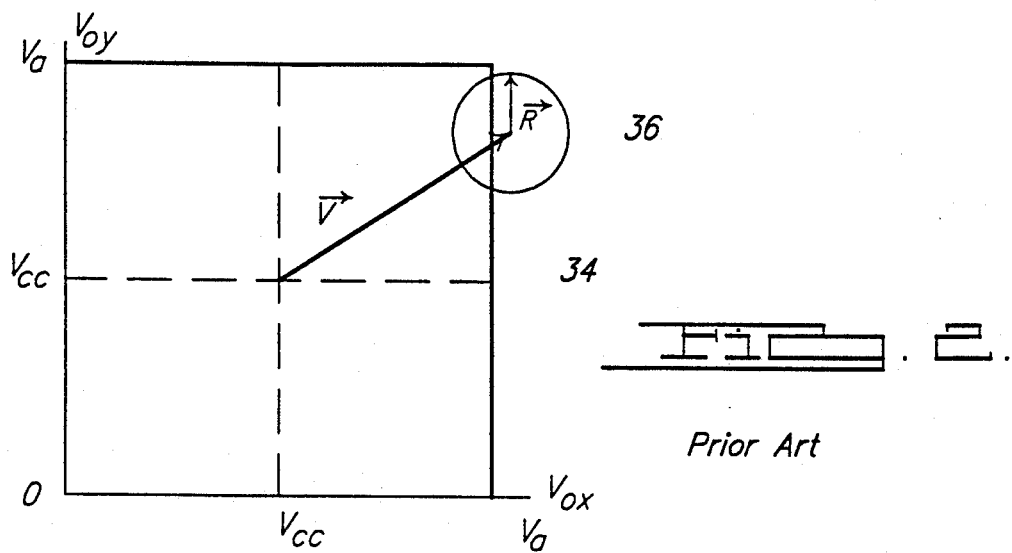
FIG. 2 is a depiction of the operational amplifier output voltage range or "window" of the electronic compass system in the '843 patent to Hormel, showing the vehicle's magnetic field voltage vector $\bar{V}$ and the earth's magnetic field voltage vector $\bar{R}$ before compensation.

Turning now to FIG. 2, there is shown a voltage window 30. The x and y axes correspond to the two DC output levels $V_{ox}$ and $V_{oy}$ of the integrator 26. The limits of the window 30 are determined by the output voltage range of the operational amplifiers within the integrator 26. This range is depicted as approximately 0 to $V_a$ volts. The voltage $V_{cc}$ is applied to the junction of the two sense coils and the integrator 26 and marks a reference for the origin 0 of the vehicle's magnetic field voltage vector $\vec{V}$.

Also shown is the earth's magnetic field voltage vector $\vec{R}$ and circle 32. The earth's magnetic field circle 32 is the locus of points described by the earth's magnetic field voltage vector $\vec{R}$ as the vehicle changes heading. The vehicle's magnetic field voltage vector $\vec{V}$ remains stationary with respect to the x and y axes, which are the frame of reference of the vehicle (and the flux-gate 18).

Figure 3A:
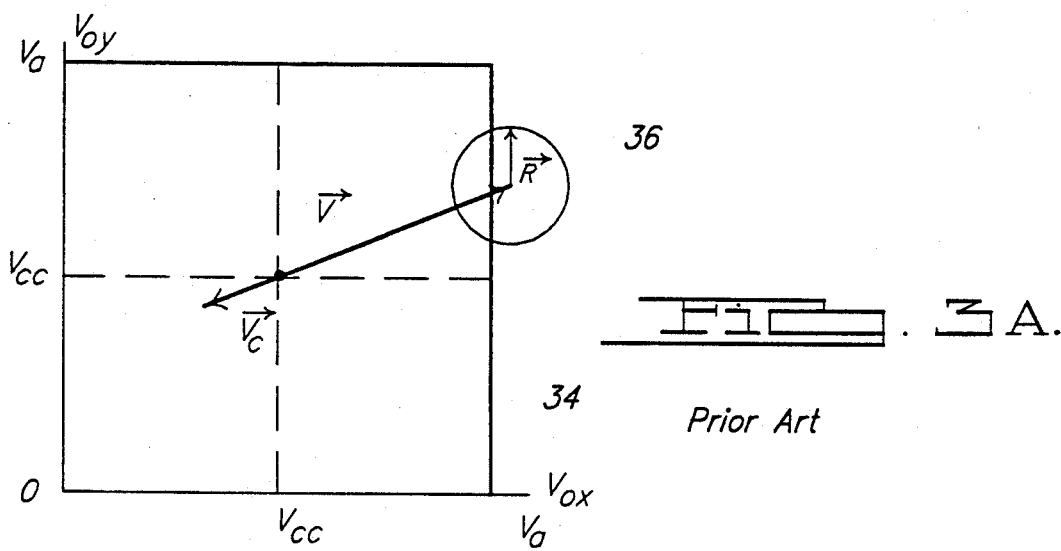
FIG. 3a is a depiction of the window of FIG. 2, but showing the compensation voltage vector $\bar{V}$.
Figure 3B:
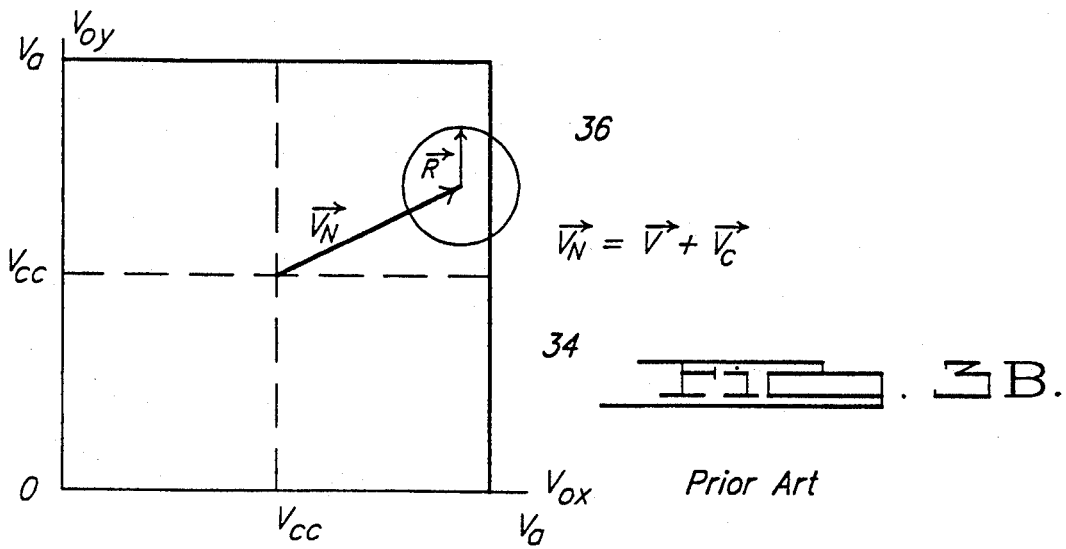
FIG. 3b is a depiction of the window of FIG. 3a, but showing the resultant of the compensation voltage vector $\bar{V}$ and the vehicle's and the earth's magnetic field voltage vectors $\bar{V}$ and $\bar{R}$.

In FIGS. 3a and 3b, there is shown the window 30 of FIG. 2. However, the earth's magnetic field circle 32 has been brought partially into the window 30 by the operation of the ranging circuit 28 of the electronic compass of FIG. 1. The compensation voltage vector $\vec{V}_c$ is added to the vehicle's magnetic field voltage vector $\vec{V}$ to produce a new vehicle magnetic field voltage vector $\vec{V}_n$. The earth's magnetic field voltage vector $\vec{R}$ remains the same as before compensation.

The ranging circuit 28 in FIG. 1 is incapable of producing enough feedback current to bring the earth's magnetic field circle 32 totally within the window 30. When abnormally large vehicle magnetic fields are present, part of the earth's field circle 32 remains outside the voltage window 30 after compensation. For vehicle headings in which the earth's magnetic field voltage vector $\vec{R}$ crosses the boundaries of the window 30, the microcomputer 12 is incapable of generating accurate headings. If the earth's magnetic field circle 32 were totally outside the window 30 after compensation, then the microcomputer 12 would be incapable of generating any accurate headings, because the operational amplifiers of the integrator 26 would be in constant saturation. Thus, calibration under the method of the '462 patent would be difficult.

Turning now to FIG. 4, there is shown the improved electronic compass system 34 for implementing the method of the present invention. The system 34 changes the DC output levels by changing the amount of feedback resistance $R_f$, thereby bringing the voltage across the sense coils to within the output voltage range of the integrator 26. This resistance is made variable to accommodate variations in magnetic fields among vehicles. It may be preset when the electronic compass system is installed in a vehicle and would be accessible to service personnel if a particular vehicle's magnetic field were to later change.

As shown in FIG. 5, feedback resistance $R_f$ produces a scaling effect. As the feedback resistance $R_f$ increases, the DC output levels of integrator 26 increase. Reducing feedback resistance $R_f$ also reduces the magnitudes of both the vehicle's magnetic field voltage vector $\vec{V}$ and the earth's magnetic field voltage vector $\vec{R}$ at the output of the integrator 26. The decrease in feedback resistance $R_f$ brings the entire earth's field circle 32 within the window of the integrator 26. Advantageously, vectors, $\vec{V}$ and $\vec{R}$ can be scaled up or down by a factor α that is proportional to feedback resistance $R_f$. For a fixed value of $R_f$, $$V_{ox} = KR_f(\vec{V}_{mx} + \vec{R}_{mx}) \quad (1)$$

$$V_{oy} = KR_f(\vec{V}_{my} + \vec{R}_{my}) \quad (2)$$

Under the method of the present invention, $$V_{ox\ new} = K\alpha R_f(\vec{V}_{mx} + \vec{R}_{mx})$$

$$V_{oy\ new} = K\alpha R_f(\vec{V}_{my} + \vec{R}_{my})$$

or $$V_{ox\ new} = \alpha V_{ox}$$

$$V_{oy\ new} = \alpha V_{oy}$$

Therefore, $\vec{V} + \vec{R}$ will become $\alpha\vec{V} + \alpha\vec{R}$ after changing the feedback resistance $R_f$ by a factor α. In FIG. 5, the factor α is less than 1 and the vectors $\vec{V}$ and $\vec{R}$ are scaled down.

Since a decrease in feedback resistance $R_f$ reduces the effects of both the earth's magnetic field voltage vector $\vec{R}$ and the vehicle's magnetic field voltage vector $\vec{V}$, the DC output levels of the integrator 26 are incapable of being accurately resolved by the 8-bit analog-to-digital converter 14. Therefore, the system of FIG. 4 employs a 10-bit analog-to-digital converter 38. Of course, other analog-to-digital converters of greater resolving power are also envisioned by this system. A commercially available 10-bit analog-to-digital converter is the Model No. 68HC68A2 manufactured by RCA. Advantageously, the present invention makes calibration under the method of the '462 patent possible for abnormally large vehicle magnetic fields.

Except for the feedback resistance $R_f$ and the analog-to-digital converter 14, the elements of the compass system 10 of FIG. 1 are identical with those of the compass system 34 of FIG. 4. However, as shown in FIG. 6, the system there is not limited to vehicles and is also envisioned for use in unmultiplexed electronic compasses employing separate feedback resistances and paths, one for each coil. The sensed magnetic field in each coil may be processed separately, using bandpass filters 42 and 43, synchronous detectors 44 and 45, integrators 46 and 47, ranging circuits 48 and 49, feedback resistances $R_{fx}$ and $R_{fy}$, and summing amplifiers 50 and 51.

Figure 7:
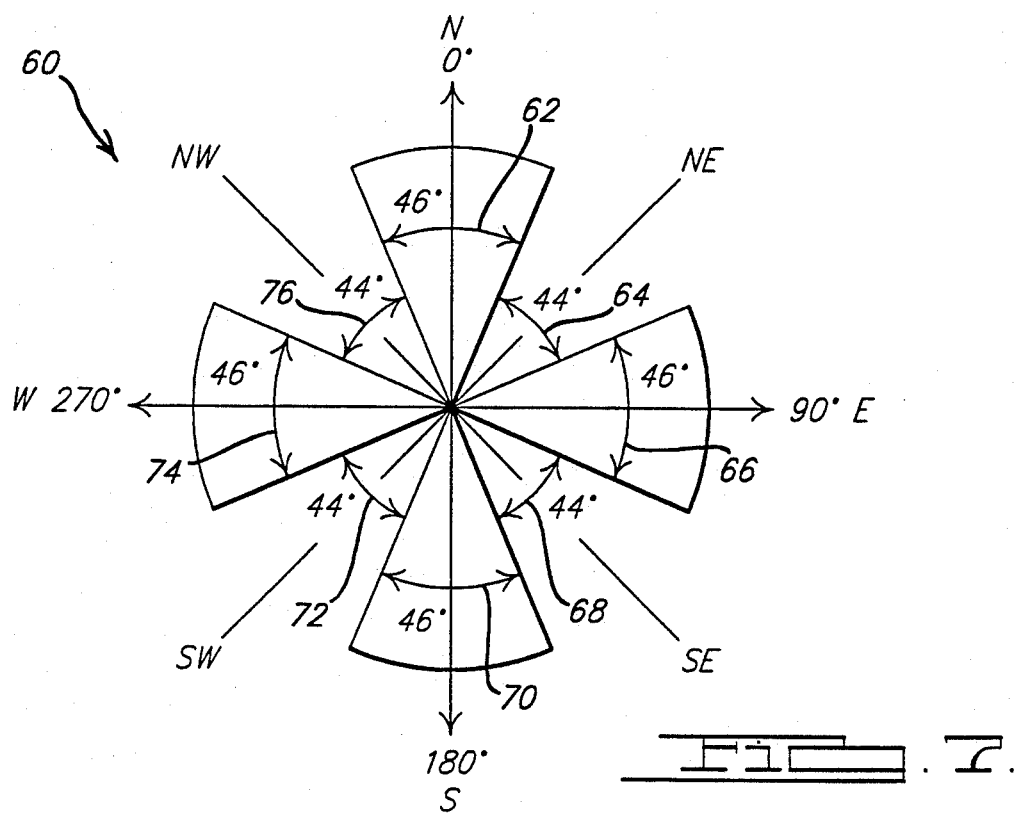
FIG. 7 is an illustration of a compass rose showing how the major and minor geographic directions may be divided in accordance with a preferred method of the present invention.

With reference now to FIG. 7, there is shown a compass rose 60 illustrating how the various geographic directions may be segmented in accordance with a preferred method of the present invention. Each of the eight geographic directions of North, Northeast, East, Southeast, South, Southwest, West and Northwest are assigned a predetermined degree range, as indicated by reference numerals 62-76. Each of the geographic directions corresponding to the major geographic directions of North, South, East and West include equal degree ranges 62, 66, 70, 74 which are slightly larger, that is by 1°, than their bordering directions (i.e., the minor geographic directions of Northeast, Southeast, Southwest and Northwest, 64, 68, 72, 76). As shown in FIG. 7, each of the major geographic directions are assigned degree ranges of 46°, while each of the minor geographic directions are assigned degree ranges of 44°.

It is a principal advantage of the method of the present invention that the degree ranges 62, 66, 70, 74 of each of the major geographic directions (North, South, East and West) be greater than each of the minor geographic directions 64, 68, 72, 76 (Northeast, Southeast, Southwest and Northwest). By increasing the degree ranges of the four major geographic directions 62, 66, 70, 74 as shown in FIG. 7, an electronic compass system such as that shown in FIG. 4 interprets sensed geographic directional heading information more in accordance with the major geographic directions of North, South, East and West.

Prior art methods of interpreting sensed geographic directional heading information have typically included segmenting each of the directions of North, Northeast, East, Southeast, South, Southwest, West and Northwest in accordance with equal predetermined degree ranges of 45° each. By increasing the degree range of the major geographic directions of North, South, East and West, an electronic compass system mounted on a vehicle provides directional information to the driver of the vehicle more closely in accordance with the major geographic directions of North, South, East and West.

The above-described method of assigning the major geographic directions greater predetermined degree ranges than the minor directions provides a significant advantage to drivers of vehicles when driving on unfamiliar roads which temporarily meander in directions out of accordance with the overall direction of the road. For example, many roads which are marked North and South, and particularly freeways in congested urban areas, frequently do not run in North-South directions along their entire distance. Such roads often assume, temporarily, Northeast-Southwest running headings or Northwest-Southeast headings. Thus, a driver of a vehicle driving along an unfamiliar stretch of road which is marked, for example, as a North-South road may become confused when an electronic compass associated with the vehicle indicates that the vehicle is heading, for example, Northeast rather than North as believed by the driver. By increasing the predetermined degree ranges of the four major geographic directions at the expense of the minor geographic directions, an electronic compass system can be programmed to interpret minor deviations from the four major geographic directions as still being in accordance with the major geographic directions. Put differently, the electronic compass system can be programmed to "ignore" small variations in headings from each of the four major geographic directions. Accordingly, even though a vehicle traveling down, for example, a North-South road temporarily assumes a slight Northeast heading, which would normally cause prior art compass systems to generate a Northeast heading signal and thereby possibly confuse the driver of the vehicle, the method of the present invention would cause the electronic compass system to interpret the slightly Northeast sensed direction as still being North and generate a North heading signal for the driver.

Figure 8:
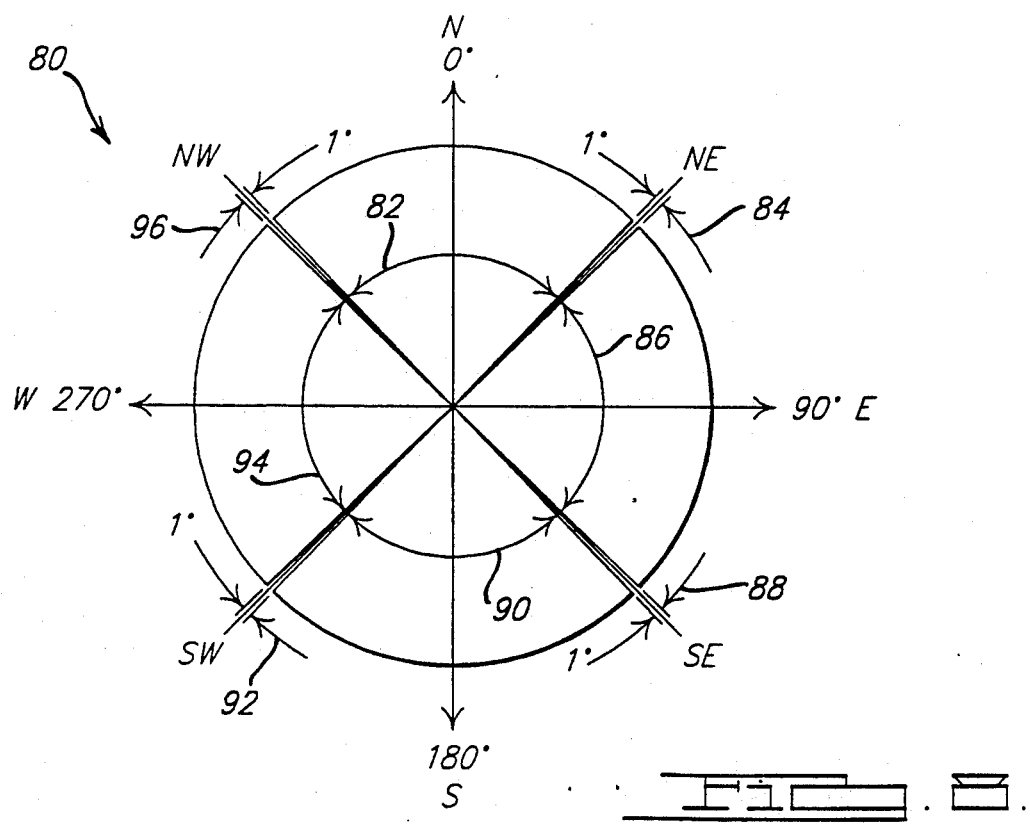
FIG. 8 is an illustration of a compass rose in accordance with an alternative preferred method of the present invention, wherein alternative degree ranges have been assigned to the major and minor geographic directions.

In FIG. 8, a compass rose 80 having predetermined degree ranges 82-96 for each of the geographic directions North, Northeast, East, Southeast, South, Southwest, West and Northwest is shown in accordance with an alternative method of the present invention. With this method, the degree ranges 82, 86, 90, 94 of major geographic directions of North, South, East and West are each increased by 44° (i.e., to 89°) at the expense of the minor geographic directions of North, East, Southeast, Southwest and Northwest (set to 1°). Thus, an electronic compass system sensing the heading of a vehicle will be even less prone to interpret temporary, severe heading changes into the Northeast, Southeast, Southwest and Northwest directions as a change in heading and will still indicate to a driver of the vehicle that the vehicle is heading either North, South, east or West.

While only two different sets of predetermined degree ranges 62-76 and 82-96 have been illustrated, it should be appreciated that the degree ranges associated with the major geographic directions may be set at an infinite number of immediate ranges between 45° and 90°. Only two differing predetermined degree ranges (i.e., ranges of 46° and 89°) have been shown to illustrate the large magnitude by which the ranges may vary. It should be appreciated, however, that as the predetermined degree ranges are increased at the expense of the minor geographic directions the accuracy of the heading information displayed by the compass system will appear to decrease relative to the heading information which would otherwise be displayed by a convention 8-point compass system incorporating eight evenly divided geographic sectors.

Figure 9:
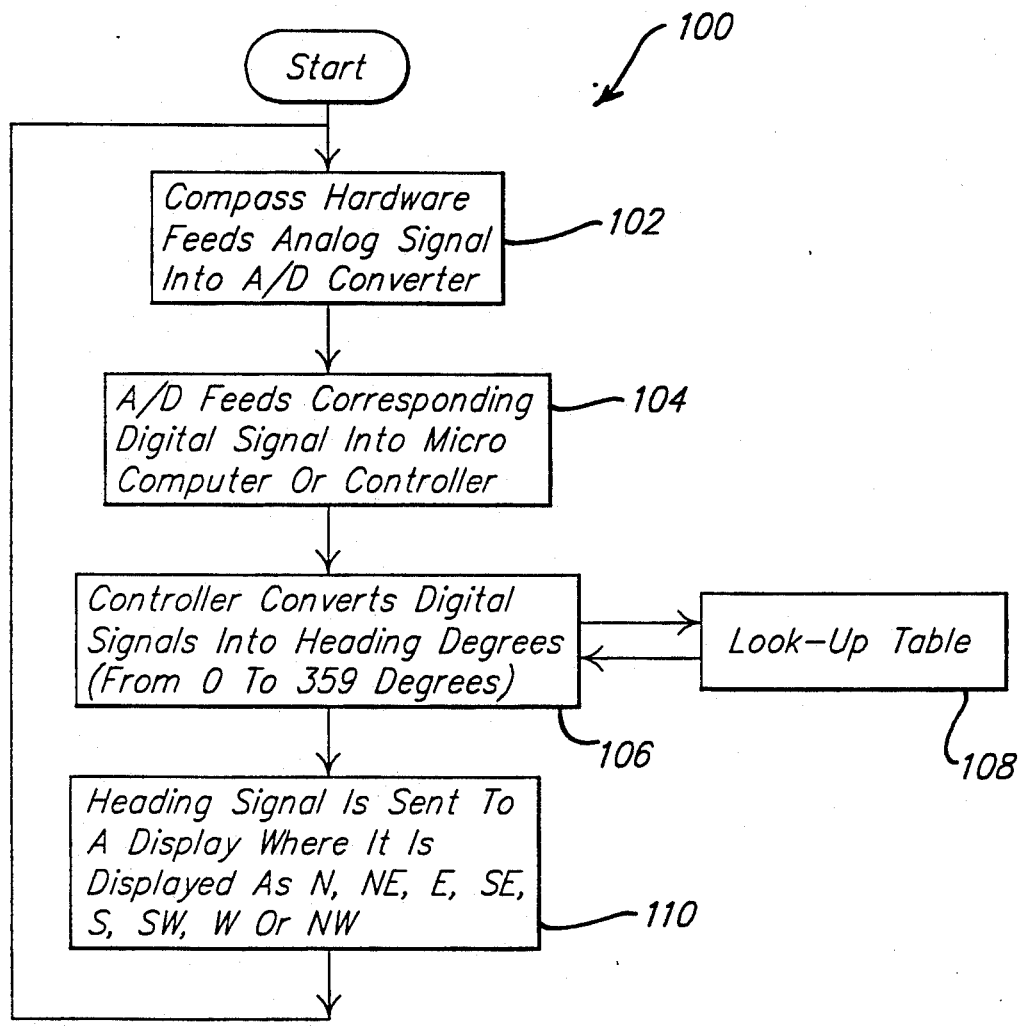
FIG. 9 is a simplified flowchart of the steps of operation in implementing the preferred methods of the present invention.

Referring now to FIG. 9, there is shown a program 100 for implementing the method of the present invention. Initially, an electronic compass system mounted on a vehicle senses the Earth's magnetic direction and feeds an analog signal in accordance therewith into an analog-to-digital converter of the system, as indicated at 102. The analog-to-digital converter feeds a corresponding digital signal into a microcomputer or controller of the compass system, as indicated at 104. The controller then converts the digital signals received from the analog-to-digital converter into heading degrees from 0° to 359°, as indicated at 106.

The controller then takes the converted heading degree values and reads a look-up table incorporating the predetermined degree ranges 62-76 of FIG. 7, as indicated at 108. The heading degree value is then compared against the predetermined degree ranges 62-76, as shown in block 108. The controller then determines the predetermined degree range 62-76 or 82-96 within which the heading degree value obtained falls within, and sends a heading signal to a display where the signal is displayed as North, Northeast, East, Southeast, South, Southwest, West or Northwest, as indicated at 110. An example, the values of the predetermined degrees ranges 62-76, which should be understood to be exemplary, are illustrated in Table 1 below:

TABLE 1

| REFERENCE NUMERAL | GEOGRAPHIC DIRECTIONAL HEADING | PREDETERMINED DEGREE RANGE |
|---|---|---|
| 62 | North | $337° < - \leq 23°$ |
| 64 | Northeast | $23° < - \leq 67°$ |
| 66 | East | $67° < - \leq 113°$ |
| 68 | Southeast | $113° < - \leq 157°$ |
| 70 | South | $157° < - \leq 203°$ |
| 72 | Southwest | $203° < - \leq 247°$ |
| 74 | West | $247° < - \leq 293°$ |
| 76 | Northwest | $293° < - \leq 337°$ |

It should thus be appreciated that the method of segmenting the various geographic directions as disclosed herein serves to significantly reduce driver confusion when navigating roads which run primarily North and South or East and West, and which temporarily meander into Northeast and Southwest or Northwest and Southeast directions. Thus, drivers of such vehicles are much less likely to be confused as an electronic compass system of the vehicle is preprogrammed to ignore small variations from the major geographic directions of North, East, South and West.

Although the invention has been described with particular reference to certain preferred embodiments thereof, variations and modifications can be effected within the spirit and scope of the following claims.

What is claimed is:

1. A vehicle electronic compass system for determining vehicle heading as a function of the earth's magnetic field, said system comprising:

magnetic sensing means for sensing the earth's magnetic field and generating a signal in accordance therewith;

signal conditioning means for receiving said signal and for converting said signal into a corresponding degree heading value, said degree heading value being one of eight predetermined heading values describing a predetermined range of degrees of the earth's magnetic field, a first heading value corresponding to a first range of degrees indicating a North direction, a second heading value corresponding to a second range of degrees indicating a Northeast value, a third heading value corresponding to a third range of degrees indicating an East direction, a fourth heading value corresponding to a fourth range of degrees indicating a Southeast direction, a fifth heading value corresponding to a fifth range of degrees indicating a South direction, a sixth heading value corresponding to a sixth range of degrees indicating a Southwest direction, a seventh heading value corresponding to a seventh range of degrees indicating a West direction, and a eighth heading value corresponding to an eighth range of degrees indicating a Northwest direction, wherein at least one of said first, third, fifth or seventh ranges is greater than forty-five degrees;

said signal conditioning means further adapted for generating a directional heading signal in accordance with said predetermined degree range within which said degree heading value falls within; and means for providing an indication to an occupant of said vehicle of said directional heading signal.

2. A vehicle electronic compass system for determining vehicle heading as a function of the earth's magnetic field, said system comprising:

a flux gate sensor for sensing the Earth's magnetic field and for generating an analog signal in accordance therewith;

an A/D converter for receiving said analog signal and for generating a corresponding digital signal;

a controller for receiving said corresponding digital signal and for converting said digital signal into a corresponding degree heading value, said degree heading value being one of eight predetermined heading values describing a predetermined range of degrees of the earth's magnetic field, a first heading value corresponding to a first range of degrees indicating a North direction, a second heading value corresponding to a second range of degrees indicating a Northeast value, a third heading value corresponding to a third range of degrees indicating an East direction, a fourth heading value corresponding to a fourth range of degrees indicating a Southeast direction, a fifth heading value corresponding to a fifth range of degrees indicating a South direction, a sixth heading value corresponding to a sixth range of degrees indicating a Southwest direction, a seventh heading value corresponding to a seventh range of degrees indicating a West direction, and a eighth heading value corresponding to an eighth range of degrees indicating a Northwest direction, wherein at least one of said first, third, fifth or seventh ranges is greater than forty-five degrees;

said controller further being adapted for generating a directional heading signal in accordance with said predetermined degree range within which said degree heading value falls within; and display means for receiving said directional heading signal and for displaying a heading corresponding to said directional heading signal.

3. The system of claim 2, wherein said predetermined ranges of degrees corresponding to said North, South, East and West directions generated by said controller are each larger in magnitude than the predetermined degree ranges corresponding to said Northeast, Northwest, Southeast and Southwest directions.

4. The system of claim 2, wherein said first predetermined degree range comprises a range of 0°±approximately 23°.

5. The system of claim 2, wherein said second predetermined degree range comprises a range of 45°±approximately 22°.

6. The system of claim 2, wherein said third predetermined degree range comprises a range of approximately 90°±23°.

7. The system of claim 2, wherein said predetermined degree range comprises a range of 135°±approximately 22°.

8. The system of claim 2, wherein said fifth predetermined degree range comprises a range of 180°±approximately 23°.

9. The system of claim 2, wherein said sixth predetermined degree range comprises a range of 225°±approximately 22°.

10. The system of claim 2, wherein said seventh predetermined degree range comprises a range of 270°±approximately 23°.

11. The system of claim 2, wherein said eighth predetermined degree range comprises a range of 315°±approximately 22°.

12. A vehicle electronic compass system for determining vehicle heading as a function of the earth's magnetic field, said system comprising:

a sensor for sensing the Earth's magnetic field and for generating an output signal in accordance therewith;

a signal conditioning circuit for receiving said output signal of said sensor and for generating a corresponding digital signal;

a controller for receiving said corresponding digital signal and for converting said signal into a degree heading value, said degree heading value being one of eight predetermined heading values describing a predetermined range of degrees of the earth's magnetic field, a first heading value corresponding to a first range of degrees indicating a North direction, a second heading value corresponding to a second range of degrees indicating a Northeast value, a third heading value corresponding to a third range of degree indicating an East direction, a fourth heading value corresponding to a fourth range of degrees indicating a Southeast direction, a fifth heading value corresponding to a fifth range of degrees indicating a South direction, a sixth heading value corresponding to a sixth range of degrees indicating a Southwest direction, a seventh heading value corresponding to a seventh range of degrees indicating a West direction, and a eighth heading value corresponding to an eighth range of degrees indicating a Northwest direction, wherein said first, third, fifth and seventh ranges are greater than said second, fourth, sixth and eighth ranges; and said controller further adapted for comparing said degree heading value with said first through eighth predetermined degree ranges and further adapted for generating a heading signal corresponding to said predetermined degree range within which said degree heading value falls.

13. The system of claim 12, further comprising display means for displaying said heading signal corresponding to said predetermined degree range within which said degree heading value falls within.

* * * * *